(12) United States Patent
Lin

(10) Patent No.: US 11,974,165 B2
(45) Date of Patent: *Apr. 30, 2024

(54) METHODS, TERMINAL DEVICE AND NETWORK DEVICE FOR CODE BLOCK SEGMENTATION

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/663,596

(22) Filed: May 16, 2022

(65) Prior Publication Data

US 2022/0286908 A1   Sep. 8, 2022

Related U.S. Application Data

(63) Continuation of application No. 16/474,380, filed as application No. PCT/CN2016/106917 on Nov. 23, 2016, now Pat. No. 11,405,823.

(51) Int. Cl.
*H04W 28/06* (2009.01)
*H04W 8/24* (2009.01)
(Continued)

(52) U.S. Cl.
CPC ........... *H04W 28/065* (2013.01); *H04W 8/24* (2013.01); *H04W 72/02* (2013.01); *H04W 72/0466* (2013.01); *H04W 72/23* (2023.01)

(58) Field of Classification Search
CPC ..... H04W 28/065; H04W 72/23; H04W 8/24; H04W 72/02; H04W 72/0466
See application file for complete search history.

(56) References Cited

U.S. PATENT DOCUMENTS

| 11,228,390 B2* | 1/2022 | Lin ........................ H04L 1/007 |
| 2003/0156543 A1 | 8/2003 | Sahinoglu |

(Continued)

FOREIGN PATENT DOCUMENTS

| BR | PI0815159 B1 | 9/2020 |
| CN | 101069377 A | 11/2007 |

(Continued)

OTHER PUBLICATIONS

First Office Action of the Indian application No. 201917024823, dated Jan. 21, 2021.

(Continued)

*Primary Examiner* — Won Tae C Kim

(57) ABSTRACT

Provided are a data processing method, a terminal device and a network device. The method comprises: a terminal device receiving first indication information, used for code block segmentation, sent by a network device; the terminal device performing, according to the first indication information, code block segmentation on the data, so as to obtain at least one code block, wherein the data is data received by the terminal device from the network device, or the data is data to be sent by the terminal device to the network device; and the terminal device encoding or decoding the at least one code block. The embodiments of the present invention improve the flexibility of an encoding/decoding process.

15 Claims, 3 Drawing Sheets

(51) Int. Cl.
  *H04W 72/02*   (2009.01)
  *H04W 72/044*  (2023.01)
  *H04W 72/23*   (2023.01)

(56) References Cited

U.S. PATENT DOCUMENTS

| | | | |
|---|---|---|---|
| 2009/0070653 | A1 | 3/2009 | Kim |
| 2009/0199066 | A1 | 8/2009 | Kim |
| 2010/0260241 | A1 | 10/2010 | Kim |
| 2012/0240009 | A1 | 9/2012 | Kim |
| 2017/0041948 | A1 | 2/2017 | Cheng et al. |
| 2017/0207880 | A1* | 7/2017 | Sun .................. H04L 1/0083 |
| 2018/0123847 | A1 | 5/2018 | Xu et al. |
| 2019/0013901 | A1* | 1/2019 | Nimbalker .......... H04L 1/0067 |
| 2019/0110309 | A1 | 4/2019 | Xu et al. |

FOREIGN PATENT DOCUMENTS

| | | | |
|---|---|---|---|
| CN | 101557272 | A | 10/2009 |
| CN | 101595702 | A | 12/2009 |
| CN | 101821980 | A | 9/2010 |
| CN | 102098125 | A | 6/2011 |
| CN | 102231632 | A | 11/2011 |
| CN | 102263617 | A | 11/2011 |
| CN | 102739260 | A | 10/2012 |
| CN | 103297193 | A | 9/2013 |
| CN | 103503351 | A | 1/2014 |
| CN | 103873192 | A | 6/2014 |
| CN | 101917253 | B | 12/2015 |
| CN | 105191175 | A | 12/2015 |
| CN | 105306166 | A | 2/2016 |
| CN | 105530072 | A | 4/2016 |
| CN | 106160987 | A | 11/2016 |
| CN | 106160987 | B | 1/2020 |
| EP | 3285423 | A1 | 2/2018 |
| EP | 3499757 | A1 | 6/2019 |
| KR | 20090017382 | A | 2/2009 |
| RU | 2437223 | C2 | 12/2011 |
| RU | 2448417 | C2 | 4/2012 |
| WO | 2010104359 | A2 | 9/2010 |
| WO | 2010118592 | A1 | 10/2010 |
| WO | 2014036196 | A2 | 3/2014 |
| WO | 2016082123 | A1 | 6/2016 |
| WO | 2016165575 | A1 | 10/2016 |
| WO | 2016179743 | A1 | 11/2016 |
| WO | 2017079574 | A1 | 5/2017 |
| WO | 2018028154 | A1 | 2/2018 |

OTHER PUBLICATIONS

First Office Action of the European application No. 16922323.7, dated Jul. 23, 2020.
Ericsson. "Design of LDPC Codes for NR", 3GPP TSG RAN WG1 Meeting #87 R1-1611321, published on Nov. 6, 2016.
Ericsson, NTU, Qualcomm, Intel, Nokia, ASB, LG, Samsung. "WF on Basics of LDPC Design", 3GPP TSG RAN WG1 Meeting #87 R1-1613093, published on Nov. 19, 2016.
First Office Action of the Canadian application No. 3048684, dated Aug. 12, 2020.
First Office Action of the Taiwanese application No. 106138252, dated Dec. 27, 2019.
First Office Action of the Russian application No. 2019119034, dated Mar. 5, 2020.
First Office Action of the Chinese application No. 201680088521.4, dated Mar. 20, 2020.
First Office Action of the Singaporean application No. 11201906107Q, dated Apr. 18, 2020.
First Office Action of the Chinese application No. 202011329763.2, dated Jun. 15, 2022.
Nokia, Alcatel-Lucent Shanghai Bell, "LDPC design for eMBB", 3GPP TSG-RAN WG1 #87 R1-1612280, Reno, U.S.A., Nov. 14-18, 2016.

3GPP TS 36.213 V12.5.0, Technical Specification, 3rd Generation Partnership Project; Technical Specification Group Radio Access Network; Evolved Universal Terrestrial Radio Access (E-UTRA); Physical layer procedures (Release 12), (Mar. 2015).
3GPP TS 36.212 V12.5.0, Technical Specification, 3rd Generation Partnership Project; Technical Specification Group Radio Access Network; Evolved Universal Terrestrial Radio Access (E-UTRA); Multiplexing and channel coding (Release 12), (Jun. 2015).
MCC Support, "Final Report of 3GPP TSG RAN WG1 #86 v1.0.0 (Gothenburg, Sweden, Aug. 22-26, 2016)", 3GPP TSG RAN WG1 Meeting #86bis R1-1608562, Lisbon, Portugal, Oct. 10-14, 2016.
Ericsson, "Impact of Decoding Algorithm to LDPC Code Performance", 3GPP TSG RAN WG1 Meeting #87 R1-1611324, Reno, USA, Nov. 14-18, 2016.
International Search Report in the international application No. PCT/CN2016/106917, dated May 2, 2017.
English translation of the Written Opinion of the International Search Authority in the international application No. PCT/CN2016/106917, dated May 2, 2017.
Non-Final Office Action of the U.S. Appl. No. 16/474,380, dated Jun. 18, 2021.
Final Office Action of the U.S. Appl. No. 16/474,380, dated Dec. 14, 2021.
First Office Action of the Vietnamese application No. 1-2019-03332, dated Apr. 18, 2022.
First Office Action of the Indonesian application No. P00201905244, dated Jul. 9, 2021.
Office Action of the Australian application No. 2016430259, dated Sep. 3, 2021.
European Search Report in the European application No. 21176956.7, dated Sep. 13, 2021.
Notice of the Indian application No. 201917024823, dated Nov. 16, 2022.
Nokia Alcatel-Lucent Shanghai Bell: "Code segmentation for eMBB data", 3GPP DRAFT; R1-1612282_Code_Segmentation, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 14, 2016-Nov. 18, 2016 Nov. 13, 2016 (Nov. 13, 2016), XP051176231, Section 2 "Code segmentation in LTE system" and section 3 "Considerations for code segmentation in 5G NR", pp. 2-3.
Supplementary European Search Report in the European application No. 16922323.7, dated Oct. 22, 2019.
3GPP TS 36.212 V8.3.0 (May 2008), 3rd Generation Partnership Project; Technical Specification Group Radio Access Network; Evolved Universal Terrestrial Radio Access (E-UTRA); Multiplexing and channel coding (Release 8). p. 1-48. 48 pages.
3GPP TS 36.213 V8.3.0 (May 2008), 3rd Generation Partnership Project; Technical Specification Group Radio Access Network; Evolved Universal Terrestrial Radio Access (E-UTRA); Physical layer procedures (Release 8). p. 1-45. 45 pages.
3GPP TSG RAN WG1 #86 bis R1-1608973, Lisbon, Portugal, Oct. 10-14, 2016, Source: ZTE Corp., ZTE Microelectronics, Title: Evaluation on Channel coding candidates for eMBB control channel, Agenda item: 8.1.3.1, Document for: Discussion. the whole document. 9 pages.
Channel Coding (3rd Edition), Edited by Yujun Liu, Henan Science and Technology Press, Jun. 1992. p. 83-85. 25 pages.
Notice of Acceptance of Invalidation Request of the Chinese application No. 201680088521.4, dated Jul. 10, 2023. 44 pages with English translation.
Notice of Acceptance of Invalidation Request of the Chinese application No. 201680088521.4, dated Jul. 14, 2023. 44 pages with English translation.
Invalid Request Opinion Statement of the Chinese application No. 201680088521.4, issued on Aug. 25, 2023. 367 pages with English translation.
First Office Action of the Korean application No. 10-2019-7018090, dated May 23, 2023. 13 pages with English translation.

* cited by examiner

METHODS, TERMINAL DEVICE AND NETWORK DEVICE FOR CODE BLOCK SEGMENTATION

CROSS REFERENCE TO RELATED APPLICATION

This application is a continuation of U.S. application Ser. No. 16/474,380 filed on Jun. 27, 2019, which is a national phase under 35 U.S.C. § 371 of PCT International Application No. PCT/CN2016/106917 filed on Nov. 23, 2016. The contents of these applications are hereby incorporated by reference in their entirety.

TECHNICAL FIELD

Embodiments of the present disclosure relate to the communications field, and more specifically, to a data processing method, a terminal device, and a network device.

RELATED ART

In a Long Term Evolution (Long Term Evolution, LTE) system, data is generally encoded based on a turbo code. In a turbo code-based encoding process, limited by a structure of an encoder, a maximum quantity of bits of each code block is 6144. When a quantity of bits of to-be-encoded data is greater than 6144, code block segmentation needs to be performed on the to-be-encoded data, to obtain ⌈L/6144⌉ code blocks, where L is the quantity of bits of the to-be-encoded data, and the to-be-encoded data generally includes 24-bit cyclic redundancy check (Cyclic Redundancy Check, CRC) information.

Future communications systems have higher requirements on data demodulation and feedback. Using a 5G system (or referred to as a 5G NR (new radio) system) as an example, the system supports ultra-reliable and low latency communications (Ultra-Reliable and Low Latency Communications, URLLC), and the URLLC generally requires a receive end to implement rapid data demodulation and feedback. In an extreme case, the URLLC requires that data transmitted within a time unit (a time unit may be, for example, a subframe) needs to be fed back within the time unit, that is, the receive end needs to send ACK/NACK information of the data that is transmitted in the same time unit in the time unit.

To support the higher requirements of the future communications systems on data demodulation and feedback, terminal device manufactures improve encoding and decoding performance inside the terminal device by using various measures. For example, the terminal device manufactures set parallel encoders (or parallel decoders) inside the terminal device, to perform parallel processing on to-be-encoded (or to-be-decoded) data, thereby reducing an encoding (decoding) delay.

A single code block segmentation manner is used in the existing LTE system, and by means of the code block segmentation manner, the encoding and decoding performance of the terminal device cannot be fully played, reducing flexibility of encoding and decoding processes.

SUMMARY

Embodiments of the present disclosure provide a data processing method, a terminal device, and a network device, to improve flexibility of encoding and decoding processes.

According to a first aspect, a data processing method is provided. The method includes: receiving, by a terminal device, first indication information used for performing code block segmentation from a network device; performing, by the terminal device, code block segmentation on data based on the first indication information, to obtain at least one code block, where the data is received by the terminal device from the network device, or the data is prepared by the terminal device so as to send to the network device; and encoding or decoding, by the terminal device, the at least one code block.

With reference to the first aspect, in some implementations of the first aspect, the first indication information is used to instruct the terminal device to divide the data into a target quantity of code blocks in at least one preset quantity of code blocks.

With reference to the first aspect, in some implementations of the first aspect, the performing, by the terminal device, code block segmentation on data based on the first indication information includes: determining, by the terminal device, a value of a field used to carry the first indication information; selecting, by the terminal device, a quantity of code blocks that corresponds to the value of the field from the preset quantities of code blocks as the target quantity of code blocks; and performing, by the terminal device, code block segmentation on the data based on the target quantity of code blocks.

With reference to the first aspect, in some implementations of the first aspect, the first indication information is used to instruct the terminal device to perform code block segmentation on the data by using a target code block segmentation manner in at least one preset code block segmentation manner.

With reference to the first aspect, in some implementations of the first aspect, the performing, by the terminal device, code block segmentation on data based on the first indication information includes: determining, by the terminal device, the value of the field used to carry the first indication information; selecting, by the terminal device, a code block segmentation manner corresponding to the value of the field from the preset code block segmentation manners as the target code block segmentation manner; and performing, by the terminal device, code block segmentation on the data based on the target code block segmentation manner.

With reference to the first aspect, in some implementations of the first aspect, the field used to carry the first indication information includes a first value set and a second value set, and when the value of the field belongs to the first value set, the first indication information is used to instruct the terminal device to divide the data into the target quantity of code blocks in the preset quantities of code blocks, or when the value of the field belongs to the second value set, the first indication information is used to instruct the terminal device to perform code block segmentation on the data by using the target code block segmentation manner in the preset code block segmentation manners.

With reference to the first aspect, in some implementations of the first aspect, the first indication information is used to indicate a value of a parameter of the target code block segmentation manner used by the terminal device when the terminal device performs code block segmentation on the data.

With reference to the first aspect, in some implementations of the first aspect, the performing, by the terminal device, code block segmentation on data based on the first indication information includes: determining, by the terminal device, the value of the field used to carry the first indication information; selecting, by the terminal device, a value corresponding to the value of the field from a plurality of values of the parameter of the target code block segmentation manner as the value of the parameter of the target code block segmentation manner; and performing, by the terminal device, code block segmentation on the data by using the target code block segmentation manner based on the value of the parameter of the target code block segmentation manner.

With reference to the first aspect, in some implementations of the first aspect, the first indication information instructs the terminal device to perform code block segmentation on the data by using the target code block segmentation manner in the preset code block segmentation manners, and the first indication information indicates the value of the parameter of the target code block segmentation manner.

With reference to the first aspect, in some implementations of the first aspect, the performing, by the terminal device, code block segmentation on data based on the first indication information includes: determining, by the terminal device, the value of the field used to carry the first indication information; selecting, by the terminal device, a code block segmentation manner corresponding to the value of the field from the preset code block segmentation manners as the target code block segmentation manner; selecting, by the terminal device, a value corresponding to the value of the field from the plurality of values of the parameter of the target code block segmentation manner as the value of the parameter of the target code block segmentation manner; and performing, by the terminal device, code block segmentation on the data by using the target code block segmentation manner based on the value of the parameter of the target code block segmentation manner.

With reference to the first aspect, in some implementations of the first aspect, the code block segmentation manner used by the terminal device to perform code block segmentation on the data includes at least one of the following code block segmentation manners: $N_{CB} = \lceil L/L_{max} \rceil$, where $N_{CB}$ indicates a quantity of code blocks into which the data needs to be segmented, L indicates a length of the data, $L_{max}$ indicates a maximum code length of the code blocks segmented from the data, and $N_{CB}$, L, and $L_{max}$ are all integers greater than or equal to 1;

$$N_{CB} = \begin{cases} 1, & L < L_{min} \\ \lfloor L/L_{min} \rfloor, & L \geq L_{min} \end{cases},$$

where $N_{CB}$ indicates the quantity of code blocks into which the data needs to be segmented, L indicates the length of the data, $L_{min}$ indicates a minimum code length of the code blocks segmented from the data, and $N_{CB}$, L, and $L_{min}$ are all integers greater than or equal to 1;

$$N_{CB} = \begin{cases} 1, & L \leq L_{min} \\ \max(\lceil L/L_{max} \rceil, \min(\lfloor L/L_{min} \rfloor, K)), & L_{min} < L \leq K \cdot L_{max} \\ \lceil L/L_{max} \rceil, & L > K \cdot L_{max} \end{cases}$$

where $N_{CB}$ indicates the quantity of code blocks into which the data needs to be segmented, L indicates the length of the data, $L_{max}$ indicates the maximum code length of the code blocks segmented from the data, $L_{min}$ indicates the minimum code length of the code blocks segmented from the data, K is an integer greater than or equal to 1, K is less than or equal to a quantity of parallel encoders or parallel decoders supported by the terminal device, $N_{CB}$, L, $L_{max}$, and $L_{min}$ are all integers greater than or equal to 1, and $L_{max}$ is greater than $L_{min}$; and $$N_{CB} = \begin{cases} \lceil L/L'_{max} \rceil, & 0 < L \leq K \cdot L'_{max} \\ \lceil L/L_{max} \rceil, & L > K \cdot L'_{max} \end{cases},$$

where $N_{CB}$ indicates the quantity of code blocks into which the data needs to be segmented, L indicates the length of the data, $L'_{max}$ indicates a first value of the maximum code length of the code blocks segmented from the data, $L_{max}$ indicates a second value of the maximum code length of the code blocks segmented from the data, $N_{CB}$, L, $L'_{max}$ and $L_{max}$ are all integers greater than or equal to 1, $L'_{max}$ is less than $L_{max}$, K is an integer greater than or equal to 1, and K is less than or equal to the quantity of parallel encoders or parallel decoders supported by the terminal device.

With reference to the first aspect, in some implementations of the first aspect, the method further includes: sending, by the terminal device, capability information to the network device, where the capability information is used to indicate the quantity of parallel encoders and/or parallel decoders supported by the terminal device.

With reference to the first aspect, in some implementations of the first aspect, the first indication information is determined by the network device based on the quantity of parallel encoders and/or parallel decoders.

With reference to the first aspect, in some implementations of the first aspect, the receiving, by a terminal device, first indication information used for performing code block segmentation from a network device includes: receiving, by the terminal device, downlink control signaling sent by the network device, where the downlink control signaling includes the first indication information.

With reference to the first aspect, in some implementations of the first aspect, the receiving, by a terminal device, first indication information used for performing code block segmentation from a network device includes: receiving, by the terminal device, higher layer signaling sent by the network device, where the higher layer signaling includes the first indication information.

With reference to the first aspect, in some implementations of the first aspect, the method further includes: receiving, by the terminal device, second indication information sent by the network device, where the second indication information is used to indicate a coding scheme of the code blocks segmented from the data; and the encoding or decoding, by the terminal device, the at least one code block includes: encoding or decoding, by the terminal device, the at least one code block based on the coding scheme indicated in the second indication information.

With reference to the first aspect, in some implementations of the first aspect, the coding scheme of the code blocks segmented from the data includes at least one of the following coding schemes: an LDPC code; a polar code; a turbo code; a TBCC; and a RM code.

According to a second aspect, a data processing method is provided. The method includes: generating, by a network device, first indication information used for performing code block segmentation; and sending, by the network device, the first indication information to a terminal device, so that the terminal device performs code block segmentation on data based on the first indication information, where the data is received by the terminal device from the network device, or the data is prepared by the terminal device so as to send to the network device.

With reference to the second aspect, in some implementations of the second aspect, the first indication information is used to instruct the terminal device to divide the data into a target quantity of code blocks in at least one preset quantity of code blocks.

With reference to the second aspect, in some implementations of the second aspect, the generating, by a network device, first indication information used for performing code block segmentation includes: selecting, by the network device, the target quantity of code blocks from the preset quantities of code blocks; selecting, by the network device, a value corresponding to the target quantity of code blocks from values of a field used to carry the first indication information as a value of the field; and generating, by the network device, the first indication information based on the value of the field.

With reference to the second aspect, in some implementations of the second aspect, the first indication information is used to instruct the terminal device to perform code block segmentation on the data by using a target code block segmentation manner in at least one preset code block segmentation manner.

With reference to the second aspect, in some implementations of the second aspect, the generating, by a network device, first indication information used for performing code block segmentation includes: selecting, by the network device, the target code block segmentation manner from the preset code block segmentation manners; selecting, by the network device, a value corresponding to the target code block segmentation manner from the values of the field used to carry the first indication information as the value of the field; and generating, by the network device, the first indication information based on the value of the field.

With reference to the second aspect, in some implementations of the second aspect, the field used to carry the first indication information includes a first value set and a second value set, and when the value of the field belongs to the first value set, the first indication information is used to instruct the terminal device to divide the data into the target quantity of code blocks in at least one preset quantity of code blocks, or when the value of the field belongs to the second value set, the first indication information is used to instruct the terminal device to perform code block segmentation on the data by using the target code block segmentation manner in at least one preset code block segmentation manner.

With reference to the second aspect, in some implementations of the second aspect, the first indication information is used to indicate a value of a parameter of the target code block segmentation manner used by the terminal device when the terminal device performs code block segmentation on the data.

With reference to the second aspect, in some implementations of the second aspect, the generating, by a network device, first indication information used for performing code block segmentation includes: selecting, by the network device, the value of the parameter of the target code block segmentation manner from values of the parameter of the target code block segmentation manner; selecting, by the network device, a value corresponding to the value of the parameter of the target code block segmentation manner from the values of the field used to carry the first indication information as the value of the field; and generating, by the network device, the first indication information based on the value of the field.

With reference to the second aspect, in some implementations of the second aspect, the first indication information instructs the terminal device to perform code block segmentation on the data by using the target code block segmentation manner in the preset code block segmentation manners, and the first indication information indicates the value of the parameter of the target code block segmentation manner.

With reference to the second aspect, in some implementations of the second aspect, the generating, by a network device, first indication information used for performing code block segmentation includes: selecting, by the network device, the target code block segmentation manner from the preset code block segmentation manners; selecting, by the network device, the value of the parameter of the target code block segmentation manner from the values of the parameter of the target code block segmentation manner; selecting, by the network device, a value corresponding to the target code block segmentation manner and the value of the parameter of the target code block segmentation manner from the values of the field used to carry the first indication information as the value of the field; and generating, by the network device, the first indication information based on the value of the field.

With reference to the second aspect, in some implementations of the second aspect, the code block segmentation manner used by the terminal device to perform code block segmentation on the data includes at least one of the following code block segmentation manners: $N_{CB}=\lceil L/L_{max} \rceil$, where $N_{CB}$ indicates a quantity of code blocks into which the data needs to be segmented, L indicates a length of the data, $L_{max}$ indicates a maximum code length of the code blocks segmented from the data, and $N_{CB}$, L, and $L_{max}$ are all integers greater than or equal to 1;

$$N_{CB} = \begin{cases} 1, & L < L_{min} \\ \lfloor L/L_{min} \rfloor, & L \geq L_{min} \end{cases},$$

where $N_{CB}$ indicates the quantity of code blocks into which the data needs to be segmented, L indicates the length of the data, $L_{min}$ indicates a minimum code length of the code blocks segmented from the data, and $N_{CB}$, L, and $L_{min}$ are all integers greater than or equal to 1;

$$N_{CB} = \begin{cases} 1, & L \leq L_{min} \\ \max(\lceil L/L_{max} \rceil, \min(\lfloor L/L_{min} \rfloor, K)), & L_{min} < L \leq K \cdot L_{max} \\ \lceil L/L_{max} \rceil, & L > K \cdot L_{max} \end{cases},$$

where $N_{CB}$ indicates the quantity of code blocks into which the data needs to be segmented, L indicates the length of the data, $L_{max}$ indicates the maximum code length of the code blocks segmented from the data, $L_{min}$ indicates the minimum code length of the code blocks segmented from the data, K is an integer greater than or equal to 1, K is less than or equal to a quantity of parallel encoders or parallel decoders supported by the terminal device, $N_{CB}$, L, $L_{max}$, and $L_{min}$ are all integers greater than or equal to 1, and $L_{max}$ is greater than $L_{min}$; and $$N_{CB} = \begin{cases} \lceil L/L'_{max} \rceil, & 0 < L \leq K \cdot L'_{max} \\ \lceil L/L_{max} \rceil, & L > K \cdot L'_{max} \end{cases},$$

where $N_{CB}$ indicates the quantity of code blocks into which the data needs to be segmented, L indicates the length of the data, $L'_{max}$ indicates a first value of the maximum code length of the code blocks segmented from the data, $L_{max}$ indicates a second value of the maximum code length of the code blocks segmented from the data, $N_{CB}$, L, $L'_{max}$, and $L_{max}$ are all integers greater than or equal to 1, $L'_{max}$ is less than $L_{max}$, K is an integer greater than or equal to 1, and K is less than or equal to the quantity of parallel encoders or parallel decoders supported by the terminal device.

With reference to the second aspect, in some implementations of the second aspect, the method further includes: receiving, by the network device, capability information sent by the terminal device, where the capability information is used to indicate the quantity of parallel encoders and/or parallel decoders supported by the terminal device.

With reference to the second aspect, in some implementations of the second aspect, the first indication information is determined by the network device based on the quantity of parallel encoders and/or parallel decoders.

With reference to the second aspect, in some implementations of the second aspect, the sending, by the network device, the first indication information to a terminal device includes: sending, by the network device, downlink control signaling to the terminal device, where the downlink control signaling includes the first indication information.

With reference to the second aspect, in some implementations of the second aspect, the sending, by the network device, the first indication information to a terminal device includes: sending, by the network device, higher layer signaling to the terminal device, where the higher layer signaling includes the first indication information.

With reference to the second aspect, in some implementations of the second aspect, the method further includes: sending, by the network device, second indication information to the terminal device, where the second indication information is used to indicate a coding scheme of the code blocks segmented from the data.

With reference to the second aspect, in some implementations of the second aspect, the coding scheme of the code blocks segmented from the data includes at least one of the following coding schemes: an LDPC code; a polar code; a turbo code; a TBCC; and a RM code.

According to a third aspect, a terminal device is provided. The terminal device includes modules configured to perform the method according to the first aspect.

According to a fourth aspect, a network device is provided. The network device includes modules configured to perform the method according to the second aspect.

According to a fifth aspect, a terminal device is provided. The terminal device includes a transceiver and an encoder, and the encoder performs the method according to the first aspect based on the transceiver.

According to a sixth aspect, a network device is provided. The network device includes a processor and a transceiver, and the processor performs the method according to the second aspect based on the transceiver.

According to a seventh aspect, a computer-readable medium is provided. The computer-readable medium stores program code executed by a terminal device, and the program code includes an instruction used to perform the method according to the first aspect.

According to an eighth aspect, a computer-readable medium is provided. The computer-readable medium stores program code executed by a network device, and the program code includes an instruction used to perform the method according to the second aspect.

In the embodiments of the present disclosure, instead of performing code block segmentation on the data by using a fixed code block segmentation manner in the prior art, the network device sends the first indication information used for performing code block segmentation to the terminal device, so that the terminal device may perform code block segmentation on the data as indicated in the first indication information, thereby improving flexibility of encoding and decoding processes.

BRIEF DESCRIPTION OF THE DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
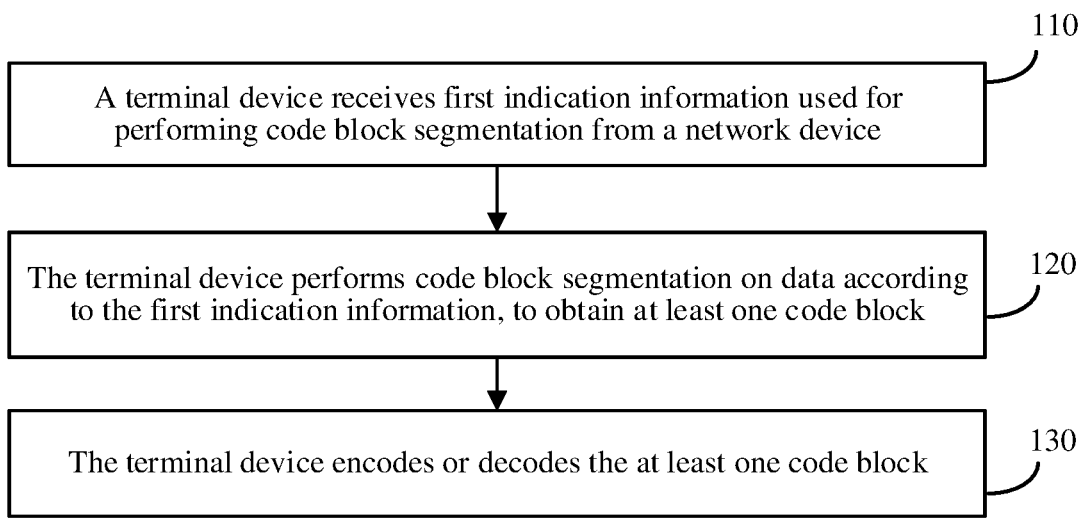
FIG. 1 is a schematic flowchart of a data processing method according to an embodiment of the present disclosure.

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

It should be understood that the technical solutions of the present disclosure can be applied to various communications systems, for example, a Global System for Mobile communication (Global System for Mobile communication, GSM) system, a Code Division Multiple Access (Code Division Multiple Access, CDMA) system, a Wideband Code Division Multiple Access (Wideband Code Division Multiple Access, WCDMA) system, a General Packet Radio Service (General Packet Radio Service, GPRS) system, an LTE system, a Long Term Evolution Advanced (Long Term Evolution Advanced, LTE-A) system, a Universal Mobile Telecommunication System (Universal Mobile Telecommunication System, UMTS), an NR (New Radio Access Technology), 5G, and the like.

It should be further understood that in the embodiments of the present disclosure, a terminal device may include, but is not limited to, a mobile station (Mobile Station, MS), a mobile terminal (Mobile Terminal), a mobile telephone (Mobile Telephone), user equipment (User Equipment, UE), a handset (handset), and portable equipment (portable equipment). The terminal device may communicate with one or more core networks through a radio access network (Radio Access Network, RAN). For example, the terminal device may be a mobile telephone (or referred to as a "cellular" phone), a computer having a wireless communication function, and the like, and the terminal device may alternatively be a portable, pocket-sized, handheld, computer-built-in, or in-vehicle mobile apparatus.

In the embodiments of the present disclosure, a network device may be an access network device. For example, the network device may be a base station, a transmit and receive point (Transmit and Receive Point, TRP), or an access point. The base station may be a base transceiver station (Base Transceiver Station, BTS) in GSM or CDMA, or may be a NodeB (NodeB) in WCDMA, or may be an evolved NodeB (evolved NodeB, eNB, or e-NodeB) in LTE, or may be a gNB (gNB) in NR or 5G. This is not specifically limited in the embodiments of the present disclosure.

To improve flexibility of encoding and decoding processes, instead of performing code block segmentation on data by using a fixed code block segmentation manner, the terminal device provided in the embodiments of the present disclosure performs code block segmentation on the data based on first indication information sent by the network device. An embodiment of the present disclosure is described below in detail with reference to FIG. 1.

FIG. 1 is a schematic flowchart of a data processing method according to an embodiment of the present disclosure. The method in FIG. 1 includes:

110: A terminal device receives first indication information used for performing code block segmentation from a network device.

120: The terminal device performs code block segmentation on data based on the first indication information, to obtain at least one code block, where the data is received by the terminal device from the network device, or the data is prepared by the terminal device so as to send to the network device.

130: The terminal device encodes or decodes the at least one code block.

In this embodiment of the present disclosure, instead of performing code block segmentation on the data by using a fixed code block segmentation manner in the prior art, the network device sends the first indication information used for performing code block segmentation to the terminal device, so that the terminal device may perform code block segmentation on the data as indicated in the first indication information, thereby improving flexibility of encoding and decoding processes.

For example, the network device may instruct, based on encoding and decoding performance of the terminal device, the terminal device to divide the data into a quantity of code blocks that matches the encoding and decoding performance of the terminal device, or the network device may instruct, based on encoding and decoding performance of the terminal device, the terminal device to perform code block segmentation on the data by using a code block segmentation manner matching the encoding and decoding performance of the terminal device. The encoding and decoding performance of the terminal device may be, for example, a quantity of parallel encoders and/or parallel decoders supported by the terminal device.

To enable the network device to well guide the terminal device to perform code block segmentation on the data, the terminal device may send capability information to the network device, to indicate the encoding and decoding performance supported by the terminal device, for example, the quantity of parallel encoders and/or parallel decoders supported by the terminal device.

Further, in some embodiments, the first indication information may be determined by the network device based on the encoding and decoding performance of the terminal device, for example, the quantity of parallel encoders and/or parallel decoders supported by the terminal device. For example, the network device learns, by using the capability information, that the terminal device has five encoders that can work in parallel, and the network device may instruct, by using the first indication information, the terminal device to divide the data into five code blocks, to fully use a parallel encoding capability of the terminal device.

It should be noted that, a manner of sending the first indication information by the network device to the terminal device is not specifically limited in this embodiment of the present disclosure. The first indication information may be sent in a dynamically scheduling manner, or the first indication information may be sent in a semi-static manner. Using the dynamically scheduling manner as an example, step 110 may include: receiving, by the terminal device, downlink control signaling sent by the network device, where the downlink control signaling includes the first indication information. Using the semi-static manner as an example, step 110 may include: receiving, by the terminal device, higher layer signaling sent by the network device, where the higher layer signaling includes the first indication information.

It should be further noted that, the data in this embodiment of the present disclosure may be data in a shared channel. Specifically, the shared channel may be a physical shared data channel, for example, may be a physical downlink shared channel (Physical Downlink Shared Channel, PDSCH), or may be a physical uplink shared channel (Physical Uplink Shared Channel, PUSCH).

It should be further noted that, a coding scheme of the code blocks segmented from the data is not specifically limited in this embodiment of the present disclosure. In some embodiments, the terminal device may perform encoding or decoding by using a fixed coding scheme.

In other embodiments, the terminal device may perform encoding or decoding based on a coding scheme indicated by the network device. Specifically, in some embodiments, the method in FIG. 1 may further include: receiving, by the terminal device, second indication information sent by the network device, where the second indication information is used to indicate a coding scheme of the code blocks segmented from the data. Step 130 may include: encoding or decoding, by the terminal device, the at least one code block based on the coding scheme indicated in the second indication information.

Further, the coding scheme of the code blocks segmented from the data includes at least one of the following coding schemes: a low-density parity-check (Low Density Parity Check Code, LDPC) code, a polar code, a turbo code, a tail biting convolutional code (Tail-Biting Convolutional Code, TBCC), and a Reed-Muller RM (Reed Muller, RM) code.

It should be noted that, the first indication information may be used by the terminal device to perform code block segmentation on the data. However, a specific type of the first indication information and an indication manner of the first indication information for code block segmentation on the data is not specifically limited in this embodiment of the present disclosure. Specifically, the first indication information may indicate at least one of the following information:

segmenting, by the terminal device, the data into a target quantity of code blocks in at least one preset quantity of code blocks; performing, by the terminal device, code block segmentation on the data by using a target code block segmentation manner in at least one preset code block segmentation manner; and a value of a parameter of the target code block segmentation manner used by the terminal device when the terminal device performs code block segmentation on the data.

In some embodiments, the first indication information indicates one type of information in the foregoing information. In other embodiments, the first indication information indicates a plurality of types of information in the foregoing information.

It should be noted that, a manner of indicating a plurality of types of information in the foregoing information by the first indication information is not specifically limited in this embodiment of the present disclosure. For example, a plurality of values of a field used to carry the first indication information may be segmented into different value sets, and the different value sets may indicate different information in the foregoing information. For another example, one value of the field used to carry the first indication information may correspond to at least two types of information in the foregoing information. Detailed descriptions are provided below with reference to specific embodiments.

Optionally, in some embodiments, the first indication information may be used to instruct the terminal device to divide the data into the target quantity of code blocks in the preset quantities of code blocks. Further, in some embodiments, the target quantity of code blocks may be determined based on the encoding and decoding performance of the terminal device, for example, the quantity of parallel encoders and/or parallel decoders supported by the terminal device. It should be understood that, the preset quantities of code blocks may be agreed on in a protocol or may be configured by the network device.

Further, in this embodiment of the present disclosure, step 120 may include: determining, by the terminal device, a value of the field used to carry the first indication information; selecting, by the terminal device, a quantity of code blocks that corresponds to the value of the field from the preset quantities of code blocks as the target quantity of code blocks; and performing, by the terminal device, code block segmentation on the data based on the target quantity of code blocks.

An example in which the downlink control signaling carries the first indication information by using a 3-bit field (that is, {b0, b1, b2} in the following Table 1) is used. As shown in Table 1, $N_i$ is a positive integer, and a value of Ni may be agreed on in a protocol or preconfigured by the network device. It is assumed that when a value of {b0, b1, b2} is {0, 0, 1}, a corresponding value of $N_2$ is 2. This indicates that the data needs to be segmented into two code blocks.

TABLE 1

| b0, b1, b2 | Preset quantity of code blocks |
|---|---|
| 0, 0, 0 | $N_1$ |
| 0, 0, 1 | $N_2$ |
| 0, 1, 0 | $N_3$ |
| 0, 1, 1 | $N_4$ |
| 1, 0, 0 | $N_5$ |
| 1, 0, 1 | $N_6$ |
| 1, 1, 0 | $N_7$ |
| 1, 1, 1 | $N_8$ |

Optionally, in some embodiments, the first indication information may be used to instruct the terminal device to perform code block segmentation on the data by using the target code block segmentation manner in the preset code block segmentation manners.

It should be understood that, the preset code block segmentation manners may be agreed on in a protocol or may be configured by the network device.

It should be noted that, the code block segmentation manner in this specification may be used to indicate a manner of determining a quantity of code blocks into which the data needs to be segmented.

It should be noted that the code block segmentation manner in this specification may also be referred to as a code block segmentation algorithm, and the code block segmentation algorithm may be used to calculate a quantity of code blocks into which the data needs to be segmented.

Further, in this embodiment of the present disclosure, step 120 may include: determining, by the terminal device, the value of the field used to carry the first indication information; selecting, by the terminal device, a code block segmentation manner corresponding to the value of the field from the preset code block segmentation manners as the target code block segmentation manner; and performing, by the terminal device, code block segmentation on the data based on the target code block segmentation manner.

In some embodiments, the target code block segmentation manner may be determined based on the encoding and decoding performance of the terminal device, for example, the quantity of parallel encoders and/or parallel decoders supported by the terminal device.

It should be noted that, a quantity of the preset code block segmentation manners and a form of the preset code block segmentation manner are not specifically limited in this embodiment of the present disclosure. For example, the downlink control signaling carries the first indication information by using 1 bit (that is, {b0}). As shown in Table 2, b0=0 corresponds to a code block segmentation manner A, and b0=1 corresponds to a code block segmentation manner B.

TABLE 2

| b0 | Code block segmentation manner |
|---|---|
| 0 | Code block segmentation manner A |
| 1 | Code block segmentation manner B |

Further, the preset code block segmentation manner may include at least one of the following code block segmentation manners:

Code block segmentation manner 1: $N_{CB}=\lceil L/L_{max} \rceil$, where $N_{CB}$ indicates a quantity of code blocks into which the data needs to be segmented, L indicates a length of the data, $L_{max}$ indicates a maximum code length of the code blocks segmented from the data, and $N_{CB}$, L, and $L_{max}$ are all integers greater than or equal to 1. It should be noted that $L_{max}$ may be agreed on in a protocol or may be configured by the network device.

Code block segmentation manner 2:

$$N_{CB} = \begin{cases} 1, & L < L_{min} \\ \lfloor L/L_{min} \rfloor, & L \geq L_{min} \end{cases},$$

where $N_{CB}$ indicates the quantity of code blocks into which the data needs to be segmented, L indicates the length of the data, $L_{min}$ indicates a minimum code length of the code blocks segmented from the data, and $N_{CB}$, L, and $L_{min}$ are all integers greater than or equal to 1. It should be noted that $L_{min}$ may be agreed on in a protocol or may be configured by the network device.

Code block segmentation manner 3:

$$N_{CB} = \begin{cases} 1, & L \leq L_{min} \\ \max(\lceil L/L_{max} \rceil, \min(\lfloor L/L_{min} \rfloor, K)), & L_{min} < L \leq K \cdot L_{max} \\ \lceil L/L_{max} \rceil, & L > K \cdot L_{max} \end{cases}$$

where $N_{CB}$ indicates the quantity of code blocks into which the data needs to be segmented, L indicates the length of the data, $L_{max}$ indicates the maximum code length of the code blocks segmented from the data, $L_{min}$ indicates the minimum code length of the code blocks segmented from the data, K is an integer greater than or equal to 1, K is less than or equal to a quantity of parallel encoders or parallel decoders supported by the terminal device, $N_{CB}$, L, $L_{max}$, and $L_{min}$ are all integers greater than or equal to 1, and $L_{max}$ is greater than $L_{min}$.

Specifically, the code block segmentation manner 3 may be performed based on the following logic:

if $L \leq L_{min}$, $N_{CB} = 1$;

if $L_{min} < L < N_{decoder} \cdot L_{min}$, $N_{CB} = \lfloor L/L_{min} \rfloor$;

if $K \cdot L_{min} \leq L \leq K \cdot L_{max}$, $N_{CB} = K$ and a length of each code block is not less than $L_{min}$ and is not greater than $L_{max}$; or if $L > K \cdot L_{max}$, $N_{CB} = \lceil L/L_{max} \rceil$ and a length of each code block is not less than $L_{min}$ and is not greater than $L_{max}$.

In some embodiments, K is equal to the quantity of parallel encoders or parallel decoders supported by the terminal device.

In this embodiment of the present disclosure, on the premise that a minimum code length requirement is satisfied, the data may be segmented into code blocks as small as possible, so that parallel encoding and decoding capabilities of the terminal device can be fully used, to accelerate an encoding speed or a decoding speed.

Code block segmentation manner 4:

$$N_{CB} = \begin{cases} \lceil L/L'_{max} \rceil, & 0 < L \leq K \cdot L'_{max} \\ \lceil L/L_{max} \rceil, & L > K \cdot L'_{max} \end{cases}$$

where $N_{CB}$ indicates the quantity of code blocks into which the data needs to be segmented, L indicates the length of the data, $N_{CB}$, L, $L'_{max}$, and $L_{max}$ are all integers greater than or equal to 1, $L'_{max}$ is less than $L_{max}$, K is an integer greater than or equal to 1, and K is less than or equal to the quantity of parallel encoders or parallel decoders supported by the terminal device. In some embodiments, K is equal to the quantity of parallel encoders or parallel decoders supported by the terminal device.

Further, in some embodiments, $L'_{max}$ may indicate a first value of the maximum code length of the code blocks segmented from the data, and $L_{max}$ may indicate a second value of the maximum code length of the code blocks segmented from the data. In this embodiment of the present disclosure, a maximum code length having a variable length is introduced, thereby further improving the flexibility of the encoding and decoding processes.

As noted above, the first indication information may indicate a quantity of code blocks into which the data needs to be segmented, or may indicate a code block segmentation manner that needs to be used for the data. Further, in some embodiments, the foregoing two indication manners may further be combined together. For details, refer to Table 3 below.

Specifically, the field used to carry the first indication information includes a first value set and a second value set, and when the value of the field belongs to the first value set, the first indication information is used to instruct the terminal device to divide the data into the target quantity of code blocks in the preset quantities of code blocks, or when the value of the field belongs to the second value set, the first indication information is used to instruct the terminal device to perform code block segmentation on the data by using the target code block segmentation manner in the preset code block segmentation manners.

For example, the downlink control signaling carries the first indication information by using a 3-bit ({b0, b1, b2}) field. When a value of {b0, b1, b2} is {0, 0, 0} or {0, 0, 1}, the first indication information may indicate a code block segmentation manner, or when a value of {b0, b1, b2} is a value other than {0, 0, 0} and {0, 0, 1}, the first indication information may indicate a quantity of code blocks into which the data needs to be segmented.

TABLE 3

| b0, b1, b2 | Preset quantity of code blocks |
|---|---|
| 0, 0, 0 | Code block segmentation manner A |
| 0, 0, 1 | Code block segmentation manner B |
| 0, 1, 0 | $N_1$ |
| 0, 1, 1 | $N_2$ |
| 1, 0, 0 | $N_3$ |
| 1, 0, 1 | $N_4$ |
| 1, 1, 0 | $N_5$ |
| 1, 1, 1 | $N_6$ |

Optionally, in some embodiments, the first indication information may be used to indicate the value of the parameter of the target code block segmentation manner used by the terminal device when the terminal device performs code block segmentation on the data. Further, in some embodiments, the value of the parameter of the target code block segmentation manner may be determined based on the encoding and decoding performance of the terminal device, for example, the quantity of parallel encoders and/or parallel decoders supported by the terminal device.

Specifically, the preset code block segmentation manner may be a code block segmentation manner agreed on in a protocol or may be a code block segmentation manner configured by the network device. The preset code block segmentation manner may be, for example, at least one of the foregoing code block segmentation manners 1 to 4. It can be learned from the foregoing code block segmentation manners 1 to 4 that, each code block segmentation manner has one or more parameters (which may also be referred to as one or more variables). For example, a parameter of the code block segmentation manner 1 is $L_{max}$, a parameter of the code block segmentation manner 2 is $L_{min}$, parameters of the code block segmentation manner 3 are $L_{max}$, $L_{min}$, and K, and parameters of the code block segmentation manner 4 are $L'_{max}$ and $L_{max}$.

Further, in this embodiment of the present disclosure, step 120 may include: determining, by the terminal device, the value of the field used to carry the first indication information; selecting, by the terminal device, a value corresponding to the value of the field from a plurality of values of the parameter of the target code block segmentation manner as the value of the parameter of the target code block segmentation manner; and performing, by the terminal device, code block segmentation on the data by using the target code block segmentation manner based on the value of the parameter of the target code block segmentation manner.

Specifically, using the foregoing code block segmentation manner 1 as an example, it is assumed that the downlink control signaling carries the first indication information by using a 2-bit field, and a correspondence between a value of the 2-bit field and a value of the parameter $L_{max}$ ($L_{max}$ may be agreed on in a protocol or may be configured by the network device) in the code block segmentation manner 1 is shown in Table 4:

TABLE 4

| b0, b1 | Value of $L_{max}$ |
|---|---|
| 0, 0 | $L_{max, 0}$ |
| 0, 1 | $L_{max, 1}$ |
| 1, 0 | $L_{max, 2}$ |
| 1, 1 | $L_{max, 3}$ |

Assuming that a value of {b0, b1} is {0, 1}, the value of $L_{max}$ in $N_{CB}=\lceil L/L_{max} \rceil$ is $L_{max,1}$ so that the terminal device may perform code block segmentation on the data based on $N_{CB}=\lceil L/L_{max,1} \rceil$, that is, first determine $N_{CB}$ based on $N_{CB}=\lceil L/L_{max,1} \rceil$, and then divide the data into $N_{CB}$ code blocks.

Optionally, in some embodiments, the first indication information instructs the terminal device to perform code block segmentation on the data by using the target code block segmentation manner in the preset code block segmentation manners, and the first indication information indicates the value of the parameter of the target code block segmentation manner. Further, in some embodiments, the target code block segmentation manner and the value of the parameter of the target code block segmentation manner may be determined based on the encoding and decoding performance of the terminal device, for example, the quantity of parallel encoders and/or parallel decoders supported by the terminal device.

In other words, in this embodiment of the present disclosure, both the code block segmentation manner used by the terminal device, and the value of the parameter of the code block segmentation manner are indicated by the network device by using the first indication information, thereby further improving the flexibility of the encoding and decoding processes.

The preset code block segmentation manner is not specifically limited in this embodiment of the present disclosure. For example, the preset code block segmentation manner may include at least one of the foregoing described code block segmentation manners 1 to 4, and parameters of different code block segmentation manners may be the same or may be different.

Specifically, step 120 may include: determining, by the terminal device, the value of the field used to carry the first indication information; selecting, by the terminal device, a code block segmentation manner corresponding to the value of the field from the preset code block segmentation manners as the target code block segmentation manner; selecting, by the terminal device, a value corresponding to the value of the field from the plurality of values of the parameter of the target code block segmentation manner as the value of the parameter of the target code block segmentation manner; and performing, by the terminal device, code block segmentation on the data by using the target code block segmentation manner based on the value of the parameter of the target code block segmentation manner.

Using an example in which the downlink control signaling carries the first indication information by using a 3-bit ({b0, b1, b2}) field, a correspondence between the value of the first indication information, the preset code block segmentation manner, and a value of a parameter of the preset code block segmentation manner may be shown in Table 5.

TABLE 5

| b0, b1, b2 | Code block segmentation manner and the value of the parameter of the code block segmentation manner |
|---|---|
| 0, 0, 0 | Code block segmentation manner 1, $L_{max, 0}$ |
| 0, 0, 1 | Code block segmentation manner 1, $L_{max, 1}$ |
| 0, 1, 0 | Code block segmentation manner 1, $L_{max, 2}$ |
| 0, 1, 1 | Code block segmentation manner 1, $L_{max, 3}$ |
| 1, 0, 0 | Code block segmentation manner 2, $L_{min, 0}$ |
| 1, 0, 1 | Code block segmentation manner 2, $L_{min, 1}$ |
| 1, 1, 0 | Code block segmentation manner 2, $L_{min, 2}$ |
| 1, 1, 1 | Code block segmentation manner 2, $L_{min, 3}$ |

Assuming that the value of {b0, b1, b2} received by the terminal device is {0, 1, 1}, the terminal device performs code block segmentation by using the code block segmentation manner 1, and the value of the parameter of the code block segmentation manner 1 is $L_{max,3}$.

Optionally, in some embodiments, the code block segmentation manner used by the terminal device to perform code block segmentation on the data includes at least one of the following code block segmentation manners: $N_{CB}=\lceil L/L_{max} \rceil$, where $N_{CB}$ indicates a quantity of code blocks into which the data needs to be segmented, L indicates a length of the data, $L_{max}$ indicates a maximum code length of the code blocks segmented from the data, and $N_{CB}$, L, and $L_{max}$ are all integers greater than or equal to 1;

$$N_{CB} = \begin{cases} 1, & L < L_{min} \\ \lfloor L/L_{min} \rfloor, & L \geq L_{min} \end{cases},$$

where $N_{CB}$ indicates the quantity of code blocks into which the data needs to be segmented, L indicates the length of the data, $L_{min}$ indicates a minimum code length of the code blocks segmented from the data, and $N_{CB}$, L, and $L_{min}$ are all integers greater than or equal to 1;

$$N_{CB} = \begin{cases} 1, & L \leq L_{min} \\ \max(\lceil L/L_{max} \rceil, \min(\lfloor L/L_{min} \rfloor, K)), & L_{min} < L \leq K \cdot L_{max} \\ \lceil L/L_{max} \rceil, & L > K \cdot L_{max} \end{cases},$$

where $N_{CB}$ indicates the quantity of code blocks into which the data needs to be segmented, L indicates the length of the data, $L_{max}$ indicates the maximum code length of the code blocks segmented from the data, $L_{min}$ indicates the minimum code length of the code blocks segmented from the data, K is an integer greater than or equal to 1, K is less than or equal to a quantity of parallel encoders or parallel decoders supported by the terminal device, $N_{CB}$, L, $L_{max}$, and $L_{min}$ are all integers greater than or equal to 1, and $L_{max}$ is max greater than $L_{min}$; and $$N_{CB} = \begin{cases} \lceil L/L'_{max} \rceil, & 0 < L \leq K \cdot L'_{max} \\ \lceil L/L_{max} \rceil, & L > K \cdot L'_{max} \end{cases},$$

where $N_{CB}$ indicates the quantity of code blocks into which the data needs to be segmented, L indicates the length of the data, $L'_{max}$ indicates a first value of the maximum code length of the code blocks segmented from the data, $L_{max}$ indicates a second value of the maximum code length of the code blocks segmented from the data, $N_{CB}$, L, $L'_{max}$, and $L_{max}$ are all integers greater than or equal to 1, $L'_{max}$ is less than $L_{max}$, K is an integer greater than or equal to 1, and K is less than or equal to the quantity of parallel encoders or parallel decoders supported by the terminal device.

The data processing method in the embodiments of the present disclosure is described above in detail with reference to FIG. 1 from a perspective of the terminal device, and the data processing method in the embodiments of the present disclosure is described below in detail with reference to FIG. 2 from a perspective of the network device. It should be understood that, the descriptions for a side of the network device correspond to the descriptions for a side of the terminal device. For similar content, refer to the foregoing descriptions, and details are not described herein again.

Figure 2:
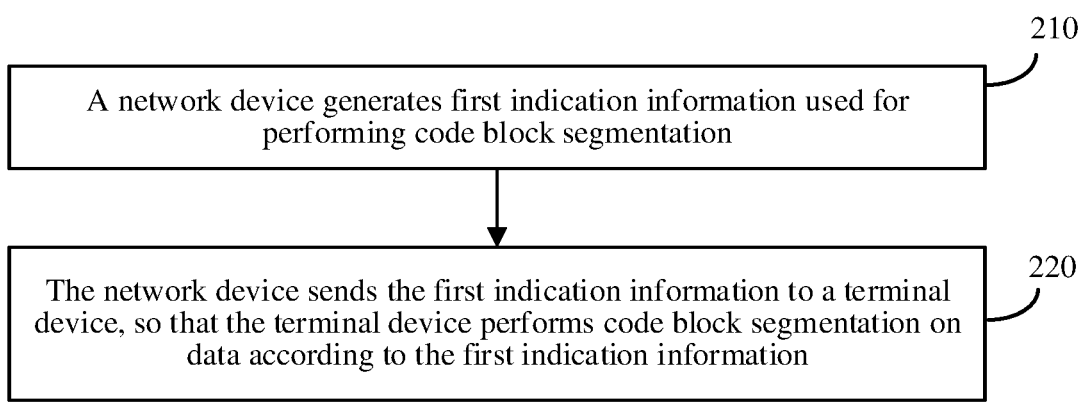
FIG. 2 is a schematic flowchart of a data processing method according to another embodiment of the present disclosure.

FIG. 2 is a schematic flowchart of a data processing method according to an embodiment of the present disclosure. The method in FIG. 2 includes:

210: A network device generates first indication information used for performing code block segmentation.

220: The network device sends the first indication information to a terminal device, so that the terminal device performs code block segmentation on data based on the first indication information, where the data is received by the terminal device from the network device, or the data is prepared by the terminal device so as to send to the network device; or the first indication information is used by the terminal device to perform code block segmentation on the data.

In this embodiment of the present disclosure, instead of performing code block segmentation on the data by using a fixed code block segmentation manner in the prior art, the network device sends the first indication information used for performing code block segmentation to the terminal device, so that the terminal device may perform code block segmentation on the data as indicated in the first indication information, thereby improving flexibility of encoding and decoding processes.

Optionally, in some embodiments, the first indication information is used to instruct the terminal device to divide the data into a target quantity of code blocks in a plurality of preset quantities of code blocks.

Optionally, in some embodiments, the first indication information is used to instruct the terminal device to perform code block segmentation on the data by using a target code block segmentation manner in a plurality of preset code block segmentation manners.

Optionally, in some embodiments, a field used to carry the first indication information includes a first value set and a second value set, and when a value of the field belongs to the first value set, the first indication information is used to instruct the terminal device to divide the data into the target quantity of code blocks in at least one preset quantity of code blocks, or when a value of the field belongs to the second value set, the first indication information is used to instruct the terminal device to perform code block segmentation on the data by using the target code block segmentation manner in at least one preset code block segmentation manner.

Optionally, in some embodiments, the code block segmentation manner of the data is the preset code block segmentation manner, and the first indication information is used to indicate a value of a parameter of the preset code block segmentation manner.

Optionally, in some embodiments, the first indication information instructs the terminal device to perform code block segmentation on the data by using the target code block segmentation manner in the plurality of preset code block segmentation manners, and the first indication information indicates a value of a parameter of the target code block segmentation manner.

Optionally, in some embodiments, the code block segmentation manner used by the terminal device to perform code block segmentation on the data includes at least one of the following code block segmentation manners:

$N_{CB} = \lceil L/L_{max} \rceil$, where $N_{CB}$ indicates a quantity of code blocks into which the data needs to be segmented, L indicates a length of the data, $L_{max}$ indicates a maximum code length of the code blocks segmented from the data, and $N_{CB}$, L, and $L_{max}$ are all integers greater than or equal to 1;

$$N_{CB} = \begin{cases} 1, & L < L_{min} \\ \lfloor L/L_{min} \rfloor, & L \geq L_{min} \end{cases},$$

where $N_{CB}$ indicates the quantity of code blocks into which the data needs to be segmented, L indicates the length of the data, $L_{min}$ indicates a minimum code length of the code blocks segmented from the data, and $N_{CB}$, L, and $L_{min}$ are all integers greater than or equal to 1;

$$N_{CB} = \begin{cases} 1, & L \leq L_{min} \\ \max(\lceil L/L_{max} \rceil, \min(\lfloor L/L_{min} \rfloor, K)), & L_{min} < L \leq K \cdot L_{max} \\ \lceil L/L_{max} \rceil, & L > K \cdot L_{max} \end{cases}$$

where $N_{CB}$ indicates the quantity of code blocks into which the data needs to be segmented, L indicates the length of the data, $L_{max}$ indicates the maximum code length of the code blocks segmented from the data, $L_{min}$ indicates the minimum code length of the code blocks segmented from the data, K is an integer greater than or equal to 1, K is less than or equal to a quantity of parallel encoders or parallel decoders supported by the terminal device, $N_{CB}$, L, $L_{max}$, and $L_{min}$ are all integers greater than or equal to 1, and $L_{max}$ is greater than $L_{min}$; and $$N_{CB} = \begin{cases} \lceil L/L'_{max} \rceil, & 0 < L \leq K \cdot L'_{max} \\ \lceil L/L_{max} \rceil, & L > K \cdot L'_{max} \end{cases},$$

where $N_{CB}$ indicates the quantity of code blocks into which the data needs to be segmented, L indicates the length of the data, $L'_{max}$ indicates a first value of the maximum code length of the code blocks segmented from the data, $L_{max}$ indicates a second value of the maximum code length of the code blocks segmented from the data, $N_{CB}$, L, $L_{max}$, and $L_{max}$ are all integers greater than or equal to 1, $L'_{max}$ is less than $L_{max}$, K is an integer greater than or equal to 1, and K is less than or equal to the quantity of parallel encoders or parallel decoders supported by the terminal device.

Optionally, in some embodiments, the method in FIG. 2 may further include: receiving, by the network device, capability information sent by the terminal device, where the capability information is used to indicate the quantity of parallel encoders and/or parallel decoders supported by the terminal device.

Optionally, in some embodiments, the first indication information is determined by the network device based on the quantity of parallel encoders and/or parallel decoders.

Optionally, in some embodiments, step 220 may include: sending, by the network device, downlink control signaling to the terminal device, where the downlink control signaling includes the first indication information.

Optionally, in some embodiments, the first indication information is indication information sent by the network device in a semi-static manner.

Optionally, in some embodiments, the method in FIG. 2 may further include: sending, by the network device, second indication information to the terminal device, where the second indication information is used to indicate a coding scheme of the code blocks segmented from the data.

Optionally, in some embodiments, the coding scheme of the code blocks segmented from the data includes at least one of the following coding schemes: an LDPC code; a polar code; a turbo code; a TBCC; and a RM code.

The method embodiments of the present disclosure are described above in detail with reference to FIG. 1 and FIG. 2, and apparatus embodiments of the present disclosure are described below in detail with reference to FIG. 3 to FIG. 6. It should be understood that, the apparatus embodiments correspond to the method embodiments. For similar descriptions, refer to the method embodiments.

Figure 3:
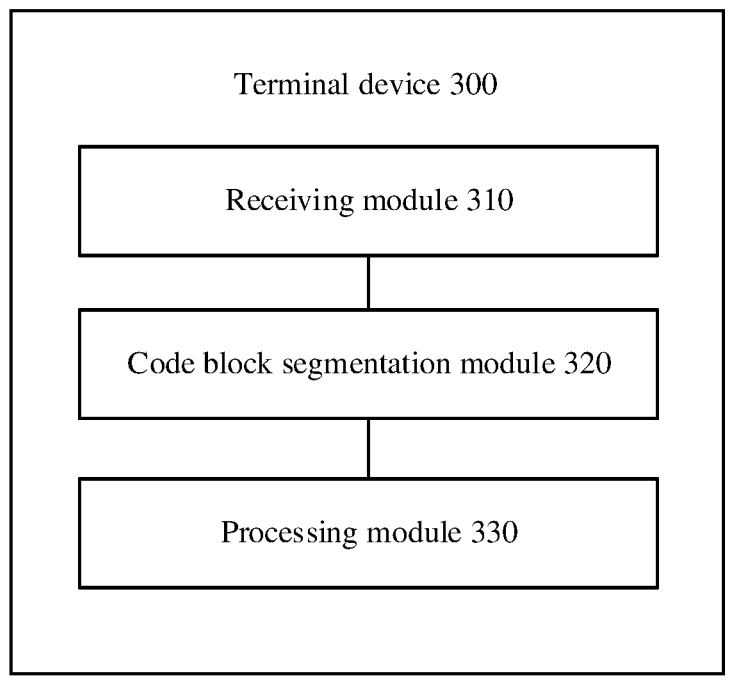
FIG. 3 is a schematic structural diagram of a terminal device according to an embodiment of the present disclosure.

FIG. 3 is a schematic structural diagram of a terminal device according to an embodiment of the present disclosure. The terminal device 300 in FIG. 3 includes:

a receiving module 310, configured to receive first indication information used for performing code block segmentation from a network device;

a code block segmentation module 320, configured to perform code block segmentation on data based on the first indication information, to obtain at least one code block, where the data is received by the terminal device 300 from the network device, or the data is prepared by the terminal device 300 so as to send to the network device; and a processing module 330, configured to encode or decode the at least one code block.

Optionally, in some embodiments, the first indication information is used to instruct the terminal device 300 to divide the data into a target quantity of code blocks in at least one preset quantity of code blocks.

Optionally, in some embodiments, the code block segmentation module 320 is specifically configured to: determine a value of a field used to carry the first indication information; select a quantity of code blocks that corresponds to the value of the field from the preset quantities of code blocks as the target quantity of code blocks; and perform code block segmentation on the data based on the target quantity of code blocks.

Optionally, in some embodiments, the first indication information is used to instruct the terminal device 300 to perform code block segmentation on the data by using a target code block segmentation manner in at least one preset code block segmentation manner.

Optionally, in some embodiments, the code block segmentation module 320 is specifically configured to: determine the value of the field used to carry the first indication information; select a code block segmentation manner corresponding to the value of the field from the preset code block segmentation manners as the target code block segmentation manner; and perform code block segmentation on the data based on the target code block segmentation manner.

Optionally, in some embodiments, the field used to carry the first indication information includes a first value set and a second value set, and when the value of the field belongs to the first value set, the first indication information is used to instruct the terminal device 300 to divide the data into the target quantity of code blocks in the preset quantities of code blocks, or when the value of the field belongs to the second value set, the first indication information is used to instruct the terminal device 300 to perform code block segmentation on the data by using the target code block segmentation manner in the preset code block segmentation manners.

Optionally, in some embodiments, the first indication information is used to indicate a value of a parameter of the target code block segmentation manner used by the terminal device 300 when the terminal device 300 performs code block segmentation on the data.

Optionally, in some embodiments, the code block segmentation module 320 is specifically configured to: determine the value of the field used to carry the first indication information; select a value corresponding to the value of the field from a plurality of values of the parameter of the target code block segmentation manner as the value of the parameter of the target code block segmentation manner; and perform code block segmentation on the data by using the target code block segmentation manner based on the value of the parameter of the target code block segmentation manner.

Optionally, in some embodiments, the first indication information instructs the terminal device 300 to perform code block segmentation on the data by using the target code block segmentation manner in the preset code block segmentation manners, and the first indication information indicates the value of the parameter of the target code block segmentation manner.

Optionally, in some embodiments, the code block segmentation module 320 is specifically configured to: determine the value of the field used to carry the first indication information; select a code block segmentation manner corresponding to the value of the field from the preset code block segmentation manners as the target code block segmentation manner; select a value corresponding to the value of the field from the plurality of values of the parameter of the target code block segmentation manner as the value of the parameter of the target code block segmentation manner; and perform code block segmentation on the data by using the target code block segmentation manner based on the value of the parameter of the target code block segmentation manner.

Optionally, in some embodiments, the code block segmentation manner used by the terminal device 300 to perform code block segmentation on the data includes at least one of the following code block segmentation manners:

$N_{CB} = \lceil L/L_{max} \rceil$, where $N_{CB}$ indicates a quantity of code blocks into which the data needs to be segmented, L indicates a length of the data, $L_{max}$ indicates a maximum code length of the code blocks segmented from the data, and $N_{CB}$, L, and $L_{max}$ are all integers, greater than or equal to 1;

$$N_{CB} = \begin{cases} 1, & L < L_{min} \\ \lfloor L/L_{min} \rfloor, & L \geq L_{min} \end{cases},$$

where $N_{CB}$ indicates the quantity of code blocks into which the data needs to be segmented, L indicates the length of the data, $L_{min}$ indicates a minimum code length of the code blocks segmented from the data, and $N_{CB}$, L, and $L_{min}$ are all integers greater than or equal to 1;

$$N_{CB} = \begin{cases} 1, & L \leq L_{min} \\ \max(\lceil L/L_{max}\rceil, \min(\lfloor L/L_{min}\rfloor, K)), & L_{min} < L \leq K \cdot L_{max} \\ \lceil L/L_{max}\rceil, & L > K \cdot L_{max} \end{cases}$$

where $N_{CB}$ indicates the quantity of code blocks into which the data needs to be segmented, L indicates the length of the data, $L_{max}$ indicates the maximum code length of the code blocks segmented from the data, $L_{min}$ indicates the minimum code length of the code blocks segmented from the data, K is an integer greater than or equal to 1, K is less than or equal to a quantity of parallel encoders or parallel decoders supported by the terminal device 300, $N_{CB}$, L, $L_{max}$, and $L_{min}$ are all integers greater than or equal to 1, and $L_{max}$ is greater than $L_{min}$; and $$N_{CB} = \begin{cases} \lceil L/L'_{max}\rceil, & 0 < L \leq K \cdot L'_{max} \\ \lceil L/L_{max}\rceil, & L > K \cdot L'_{max} \end{cases},$$

where $N_{CB}$ indicates the quantity of code blocks into which the data needs to be segmented, L indicates the length of the data, $L'_{max}$ indicates a first value of the maximum code length of the code blocks segmented from the data, $L_{max}$ indicates a second value of the maximum code length of the code blocks segmented from the data, $N_{CB}$, L, $L'_{max}$, and $L_{max}$ are all integers greater than or equal to 1, $L'_{max}$ is less than $L_{max}$, K is an integer greater than or equal to 1, and K is less than or equal to the quantity of parallel encoders or parallel decoders supported by the terminal device 300.

Optionally, in some embodiments, the terminal device 300 further includes: a sending module, configured to send capability information to the network device, where the capability information is used to indicate the quantity of parallel encoders and/or parallel decoders supported by the terminal device 300.

Optionally, in some embodiments, the first indication information is determined by the network device based on the quantity of parallel encoders and/or parallel decoders.

Optionally, in some embodiments, the receiving module 310 is specifically configured to receive downlink control signaling sent by the network device, where the downlink control signaling includes the first indication information.

Optionally, in some embodiments, the receiving module 310 is specifically configured to receive higher layer signaling sent by the network device, where the higher layer signaling includes the first indication information.

Optionally, in some embodiments, the receiving module 310 is further configured to receive second indication information sent by the network device, where the second indication information is used to indicate a coding scheme of the code blocks segmented from the data; and the processing module 330 is specifically configured to encode or decode the at least one code block based on the coding scheme indicated in the second indication information.

Optionally, in some embodiments, the coding scheme of the code blocks segmented from the data includes at least one of the following coding schemes: an LDPC code; a polar code; a turbo code; a TBCC; and a RM code.

Figure 4:
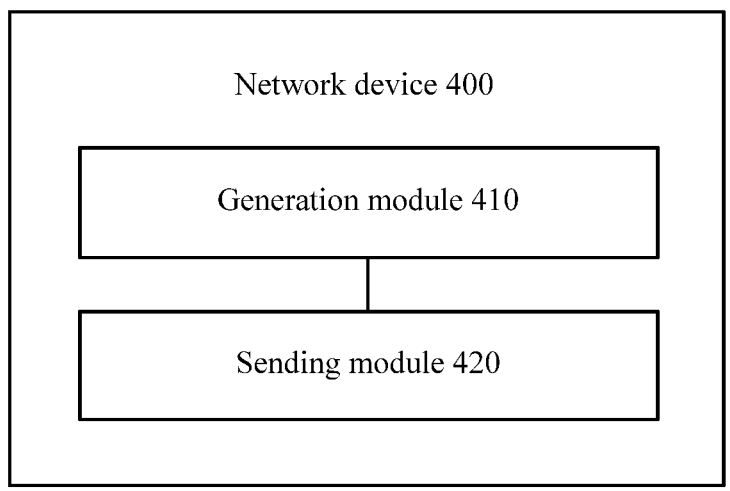
FIG. 4 is a schematic structural diagram of a network device according to an embodiment of the present disclosure.

FIG. 4 is a schematic structural diagram of a network device according to an embodiment of the present disclosure. The network device 400 in FIG. 4 includes:

a generation module 410, configured to generate first indication information used for performing code block segmentation; and a sending module 420, configured to send the first indication information to a terminal device, so that the terminal device performs code block segmentation on data based on the first indication information, where the data is received by the terminal device from the network device 400, or the data is prepared by the terminal device so as to send to the network device 400.

Optionally, in some embodiments, the first indication information is used to instruct the terminal device to divide the data into a target quantity of code blocks in at least one preset quantity of code blocks.

Optionally, in some embodiments, the generation module 410 is specifically configured to: select the target quantity of code blocks from the preset quantities of code blocks; select a value corresponding to the target quantity of code blocks from values of a field used to carry the first indication information as a value of the field; and generate the first indication information based on the value of the field.

Optionally, in some embodiments, the first indication information is used to instruct the terminal device to perform code block segmentation on the data by using a target code block segmentation manner in at least one preset code block segmentation manner.

Optionally, in some embodiments, the generation module 410 is specifically configured to: select the target code block segmentation manner from the preset code block segmentation manners; select a value corresponding to the target code block segmentation manner from the values of the field used to carry the first indication information as the value of the field; and generate the first indication information based on the value of the field.

Optionally, in some embodiments, the field used to carry the first indication information includes a first value set and a second value set, and when the value of the field belongs to the first value set, the first indication information is used to instruct the terminal device to divide the data into the target quantity of code blocks in at least one preset quantity of code blocks, or when the value of the field belongs to the second value set, the first indication information is used to instruct the terminal device to perform code block segmentation on the data by using the target code block segmentation manner in at least one preset code block segmentation manner.

Optionally, in some embodiments, the first indication information is used to indicate a value of a parameter of the target code block segmentation manner used by the terminal device when the terminal device performs code block segmentation on the data.

Optionally, in some embodiments, the generation module 410 is specifically configured to: select the value of the parameter of the target code block segmentation manner from values of the parameter of the target code block segmentation manner; select a value corresponding to the value of the parameter of the target code block segmentation manner from the values of the field used to carry the first indication information as the value of the field; and generate the first indication information based on the value of the field.

Optionally, in some embodiments, the first indication information instructs the terminal device to perform code block segmentation on the data by using the target code block segmentation manner in the preset code block segmentation manners, and the first indication information indicates the value of the parameter of the target code block segmentation manner.

Optionally, in some embodiments, the generation module 410 is specifically configured to: select the target code block segmentation manner from the preset code block segmentation manners; select the value of the parameter of the target code block segmentation manner from the values of the parameter of the target code block segmentation manner; select a value corresponding to the target code block segmentation manner and the value of the parameter of the target code block segmentation manner from the values of the field used to carry the first indication information as the value of the field;

and generate the first indication information based on the value of the field.

Optionally, in some embodiments, the code block segmentation manner used by the terminal device to perform code block segmentation on the data includes at least one of the following code block segmentation manners:

$N_{CB} = \lceil L/L_{max} \rceil$, where $N_{CB}$ indicates a quantity of code blocks into which the data needs to be segmented, L indicates a length of the data, $L_{max}$ indicates a maximum code length of the code blocks segmented from the data, and $N_{CB}$, L, and $L_{max}$ are all integers greater than or equal to 1;

$$N_{CB} = \begin{cases} 1, & L < L_{min} \\ \lfloor L/L_{min} \rfloor, & L \geq L_{min} \end{cases},$$

where $N_{CB}$ indicates the quantity of code blocks into which the data needs to be segmented, L indicates the length of the data, $L_{min}$ indicates a minimum code length of the code blocks segmented from the data, and $N_{CB}$, L, and $L_{min}$ are all integers greater than or equal to 1;

$$N_{CB} = \begin{cases} 1, & L \leq L_{min} \\ \max(\lceil L/L_{max} \rceil, \min(\lfloor L/L_{min} \rfloor, K)), & L_{min} < L \leq K \cdot L_{max} \\ \lceil L/L_{max} \rceil, & L > K \cdot L_{max} \end{cases}$$

where $N_{CB}$ indicates the quantity of code blocks into which the data needs to be segmented, L indicates the length of the data, $L_{max}$ indicates the maximum code length of the code blocks segmented from the data, $L_{min}$ indicates the minimum code length of the code blocks segmented from the data, K is an integer greater than or equal to 1, K is less than or equal to a quantity of parallel encoders or parallel decoders supported by the terminal device, $N_{CB}$, L, $L_{max}$, and $L_{min}$ are all integers greater than or equal to 1, and $L_{max}$ is greater than $L_{min}$; and $$N_{CB} = \begin{cases} \lceil L/L'_{max} \rceil, & 0 < L \leq K \cdot L'_{max} \\ \lceil L/L_{max} \rceil, & L > K \cdot L'_{max} \end{cases},$$

where $N_{CB}$ indicates the quantity of code blocks into which the data needs to be segmented, L indicates the length of the data, $L'_{max}$ indicates a first value of the maximum code length of the code blocks segmented from the data, $L_{max}$ indicates a second value of the maximum code length of the code blocks segmented from the data, $N_{CB}$, L, $L'_{max}$, and $L_{max}$ are all integers greater than or equal to 1, $L'_{max}$ is less than $L_{max}$, K is an integer greater than or equal to 1, and K is less than or equal to the quantity of parallel encoders or parallel decoders supported by the terminal device.

Optionally, in some embodiments, the network device 400 further includes: a receiving module, configured to receive capability information sent by the terminal device, where the capability information is used to indicate the quantity of parallel encoders and/or parallel decoders supported by the terminal device.

Optionally, in some embodiments, the first indication information is determined by the network device 400 based on the quantity of parallel encoders and/or parallel decoders.

Optionally, in some embodiments, the sending module 420 is specifically configured to send downlink control signaling to the terminal device, where the downlink control signaling includes the first indication information.

Optionally, in some embodiments, the sending module 420 is specifically configured to send higher layer signaling to the terminal device, where the higher layer signaling includes the first indication information.

Optionally, in some embodiments, the sending module 420 is further configured to send second indication information to the terminal device, where the second indication information is used to indicate a coding scheme of the code blocks segmented from the data.

Optionally, in some embodiments, the coding scheme of the code blocks segmented from the data includes at least one of the following coding schemes: an LDPC code; a polar code; a turbo code; a TBCC; and a RM code.

Figure 5:
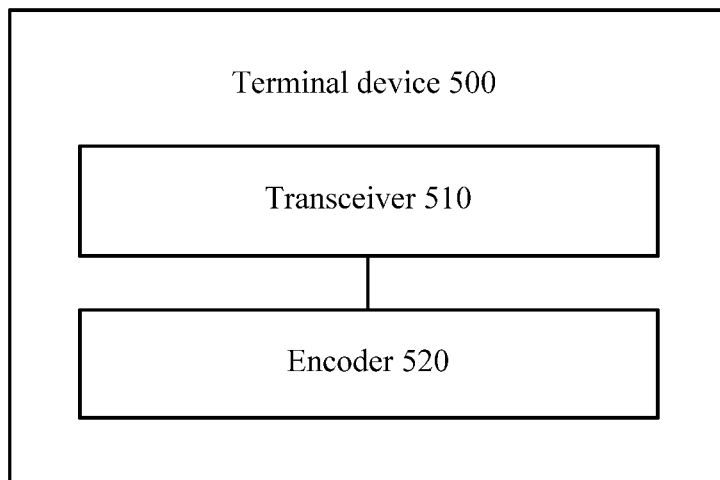
FIG. 5 is a schematic structural diagram of a terminal device according to another embodiment of the present disclosure.

FIG. 5 is a schematic structural diagram of a terminal device according to an embodiment of the present disclosure. The terminal device 500 in FIG. 5 includes:

a transceiver 510, configured to receive first indication information used for performing code block segmentation from a network device; and an encoder 520, configured to: perform code block segmentation on data based on the first indication information, to obtain at least one code block, where the data is received by the terminal device 500 from the network device, or the data is prepared by the terminal device 300 so as to send to the network device; and encode or decode the at least one code block.

Optionally, in some embodiments, the first indication information is used to instruct the terminal device 500 to divide the data into a target quantity of code blocks in at least one preset quantity of code blocks.

Optionally, in some embodiments, the encoder 520 is specifically configured to: determine a value of a field used to carry the first indication information; select a quantity of code blocks that corresponds to the value of the field from the preset quantities of code blocks as the target quantity of code blocks; and perform code block segmentation on the data based on the target quantity of code blocks.

Optionally, in some embodiments, the first indication information is used to instruct the terminal device 500 to perform code block segmentation on the data by using a target code block segmentation manner in at least one preset code block segmentation manner.

Optionally, in some embodiments, the encoder 520 is specifically configured to: determine the value of the field used to carry the first indication information; select a code block segmentation manner corresponding to the value of the field from the preset code block segmentation manners as the target code block segmentation manner; and perform code block segmentation on the data based on the target code block segmentation manner.

Optionally, in some embodiments, the field used to carry the first indication information includes a first value set and a second value set, and when the value of the field belongs to the first value set, the first indication information is used to instruct the terminal device 500 to divide the data into the target quantity of code blocks in the preset quantities of code blocks, or when the value of the field belongs to the second value set, the first indication information is used to instruct the terminal device 500 to perform code block segmentation on the data by using the target code block segmentation manner in the preset code block segmentation manners.

Optionally, in some embodiments, the first indication information is used to indicate a value of a parameter of the target code block segmentation manner used by the encoder 520 when the encoder 520 performs code block segmentation on the data.

Optionally, in some embodiments, the encoder 520 is specifically configured to: determine the value of the field used to carry the first indication information; select a value corresponding to the value of the field from a plurality of values of the parameter of the target code block segmentation manner as the value of the parameter of the target code block segmentation manner; and perform code block segmentation on the data by using the target code block segmentation manner based on the value of the parameter of the target code block segmentation manner.

Optionally, in some embodiments, the first indication information instructs the terminal device 500 to perform code block segmentation on the data by using the target code block segmentation manner in the preset code block segmentation manners, and the first indication information indicates the value of the parameter of the target code block segmentation manner.

Optionally, in some embodiments, the encoder 520 is specifically configured to: determine the value of the field used to carry the first indication information; select a code block segmentation manner corresponding to the value of the field from the preset code block segmentation manners as the target code block segmentation manner; select a value corresponding to the value of the field from the plurality of values of the parameter of the target code block segmentation manner as the value of the parameter of the target code block segmentation manner; and perform code block segmentation on the data by using the target code block segmentation manner based on the value of the parameter of the target code block segmentation manner.

Optionally, in some embodiments, the code block segmentation manner used by the terminal device 500 to perform code block segmentation on the data includes at least one of the following code block segmentation manners:

$N_{CB} = \lceil L/L_{max} \rceil$, where $N_{CB}$ indicates a quantity of code blocks into which the data needs to be segmented, L indicates a length of the data, $L_{max}$ indicates a maximum code length of the code blocks segmented from the data, and $N_{CB}$, L, and $L_{max}$ are all integers greater than or equal to 1;

$$N_{CB} = \begin{cases} 1, & L < L_{min} \\ \lfloor L/L_{min} \rfloor, & L \geq L_{min} \end{cases},$$

where $N_{CB}$ indicates the quantity of code blocks into which the data needs to be segmented, L indicates the length of the data, $L_{min}$ indicates a minimum code length of the code blocks segmented from the data, and $N_{CB}$, L, and $L_{min}$ are all integers greater than or equal to 1;

$$N_{CB} = \begin{cases} 1, & L \leq L_{min} \\ \max(\lceil L/L_{max} \rceil, \min(\lfloor L/L_{min} \rfloor, K)), & L_{min} < L \leq K \cdot L_{max} \\ \lceil L/L_{max} \rceil, & L > K \cdot L_{max} \end{cases},$$

where $N_{CB}$ indicates the quantity of code blocks into which the data needs to be segmented, L indicates the length of the data, $L_{max}$ indicates the maximum code length of the code blocks segmented from the data, $L_{min}$ indicates the minimum code length of the code blocks segmented from the data, K is an integer greater than or equal to 1, K is less than or equal to a quantity of parallel encoders or parallel decoders supported by the terminal device 500, $N_{CB}$, L, $L_{max}$, and $L_{min}$ are all integers greater than or equal to 1, and $L_{max}$ is greater than $L_{min}$; and $$N_{CB} = \begin{cases} \lceil L/L'_{max} \rceil, & 0 < L \leq K \cdot L'_{max} \\ \lceil L/L_{max} \rceil, & L > K \cdot L'_{max} \end{cases},$$

where $N_{CB}$ indicates the quantity of code blocks into which the data needs to be segmented, L indicates the length of the data, $L'_{max}$ indicates a first value of the maximum code length of the code blocks segmented from the data, $L_{max}$ indicates a second value of the maximum code length of the code blocks segmented from the data, $N_{CB}$, L, $L'_{max}$, and $L_{max}$ are all integers greater than or equal to 1, $L'_{max}$ is less than $L_{max}$, K is an integer greater than or equal to 1, and K is less than or equal to the quantity of parallel encoders or parallel decoders supported by the terminal device 500.

Optionally, in some embodiments, the transceiver 510 is further configured to send capability information to the network device, where the capability information is used to indicate the quantity of parallel encoders and/or parallel decoders supported by the terminal device 500.

Optionally, in some embodiments, the first indication information is determined by the network device based on the quantity of parallel encoders and/or parallel decoders.

Optionally, in some embodiments, the transceiver 510 is specifically configured to receive downlink control signaling sent by the network device, where the downlink control signaling includes the first indication information.

Optionally, in some embodiments, the transceiver 510 is specifically configured to receive higher layer signaling sent by the network device, where the higher layer signaling includes the first indication information.

Optionally, in some embodiments, the transceiver 510 is further configured to receive second indication information sent by the network device, where the second indication information is used to indicate a coding scheme of the code blocks segmented from the data; and the encoder 520 is specifically configured to encode or decode the at least one code block based on the coding scheme indicated in the second indication information.

Optionally, in some embodiments, the coding scheme of the code blocks segmented from the data includes at least one of the following coding schemes: an LDPC code; a polar code; a turbo code; a TBCC; and a RM code.

Figure 6:
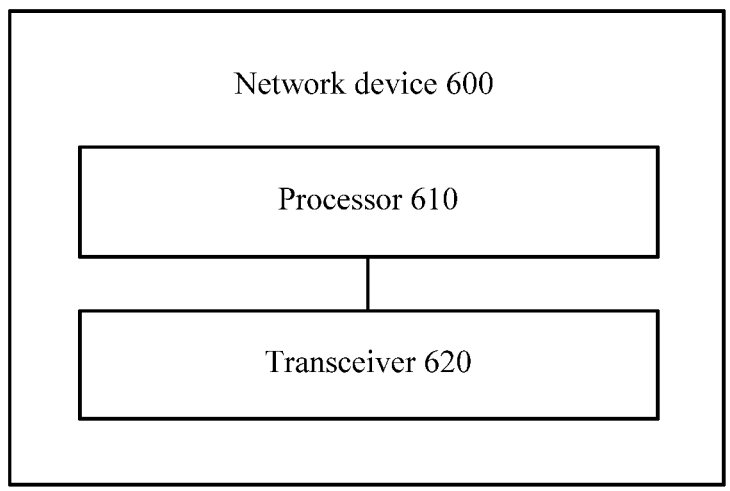
FIG. 6 is a schematic structural diagram of a network device according to another embodiment of the present disclosure.

FIG. 6 is a schematic structural diagram of a network device according to an embodiment of the present disclosure. The network device 600 in FIG. 6 includes:

a processor 610, configured to generate first indication information used for performing code block segmentation;

a transceiver 620, configured to send the first indication information to a terminal device, so that the terminal device performs code block segmentation on data based on the first indication information, where the data is received by the terminal device from the network device 600, or the data is prepared by the terminal device so as to send to the network device 600.

Optionally, in some embodiments, the first indication information is used to instruct the terminal device to divide the data into a target quantity of code blocks in at least one preset quantity of code blocks.

Optionally, in some embodiments, the processor 610 is specifically configured to: select the target quantity of code blocks from the preset quantities of code blocks; select a value corresponding to the target quantity of code blocks from values of a field used to carry the first indication information as a value of the field; and generate the first indication information based on the value of the field.

Optionally, in some embodiments, the first indication information is used to instruct the terminal device to perform code block segmentation on the data by using a target code block segmentation manner in at least one preset code block segmentation manner.

Optionally, in some embodiments, the processor 610 is specifically configured to: select the target code block segmentation manner from the preset code block segmentation manners; select a value corresponding to the target code block segmentation manner from the values of the field used to carry the first indication information as the value of the field; and generate the first indication information based on the value of the field.

Optionally, in some embodiments, the field used to carry the first indication information includes a first value set and a second value set, and when the value of the field belongs to the first value set, the first indication information is used to instruct the terminal device to divide the data into the target quantity of code blocks in at least one preset quantity of code blocks, or when the value of the field belongs to the second value set, the first indication information is used to instruct the terminal device to perform code block segmentation on the data by using the target code block segmentation manner in at least one preset code block segmentation manner.

Optionally, in some embodiments, the first indication information is used to indicate a value of a parameter of the target code block segmentation manner used by the terminal device when the terminal device performs code block segmentation on the data.

Optionally, in some embodiments, the processor 610 is specifically configured to: select the value of the parameter of the target code block segmentation manner from values of the parameter of the target code block segmentation manner; select a value corresponding to the value of the parameter of the target code block segmentation manner from the values of the field used to carry the first indication information as the value of the field; and generate the first indication information based on the value of the field.

Optionally, in some embodiments, the first indication information instructs the terminal device to perform code block segmentation on the data by using the target code block segmentation manner in the preset code block segmentation manners, and the first indication information indicates the value of the parameter of the target code block segmentation manner.

Optionally, in some embodiments, the processor 610 is specifically configured to: select the target code block segmentation manner from the preset code block segmentation manners; select the value of the parameter of the target code block segmentation manner from the values of the parameter of the target code block segmentation manner; select a value corresponding to the target code block segmentation manner and the value of the parameter of the target code block segmentation manner from the values of the field used to carry the first indication information as the value of the field; and generate the first indication information based on the value of the field.

Optionally, in some embodiments, the code block segmentation manner used by the terminal device to perform code block segmentation on the data includes at least one of the following code block segmentation manners:

$N_{CB} = \lceil L/L_{max} \rceil$, where $N_{CB}$ indicates a quantity of code blocks into which the data needs to be segmented, L indicates a length of the data, $L_{max}$ indicates a maximum code length of the code blocks segmented from the data, and $N_{CB}$, L, and $L_{max}$ are all integers greater than or equal to 1;

$$N_{CB} = \begin{cases} 1, & L < L_{min} \\ \lfloor L/L_{min} \rfloor, & L \geq L_{min} \end{cases},$$

where $N_{CB}$ indicates the quantity of code blocks into which the data needs to be segmented, L indicates the length of the data, $L_{min}$ indicates a minimum code length of the code blocks segmented from the data, and $N_{CB}$, L, and $L_{min}$ are all integers greater than or equal to 1;

$$N_{CB} = \begin{cases} 1, & L \leq L_{min} \\ \max(\lceil L/L_{max} \rceil, \min(\lfloor L/L_{min} \rfloor, K)), & L_{min} < L \leq K \cdot L_{max} \\ \lceil L/L_{max} \rceil, & L > K \cdot L_{max} \end{cases},$$

where $N_{CB}$ indicates the quantity of code blocks into which the data needs to be segmented, L indicates the length of the data, $L_{max}$ indicates the maximum code length of the code blocks segmented from the data, $L_{min}$ indicates the minimum code length of the code blocks segmented from the data, K is an integer greater than or equal to 1, K is less than or equal to a quantity of parallel encoders or parallel decoders supported by the terminal device, $N_{CB}$, L, $L_{max}$, and $L_{min}$ are all integers greater than or equal to 1, and $L_{max}$ is greater than $L_{min}$; and $$N_{CB} = \begin{cases} \lceil L/L'_{max} \rceil, & 0 < L \leq K \cdot L'_{max} \\ \lceil L/L_{max} \rceil, & L > K \cdot L'_{max} \end{cases},$$

where $N_{CB}$ indicates the quantity of code blocks into which the data needs to be segmented, L indicates the length of the data, $L'_{max}$ indicates a first value of the maximum code length of the code blocks segmented from the data, $L_{max}$ indicates a second value of the maximum code length of the code blocks segmented from the data, $N_{CB}$, L, $L'_{max}$, and $L_{max}$ are all integers greater than or equal to 1, $L'_{max}$ is less than $L_{max}$, K is an integer greater than or equal to 1, and K is less than or equal to the quantity of parallel encoders or parallel decoders supported by the terminal device.

Optionally, in some embodiments, the transceiver 620 is further configured to receive capability information sent by the terminal device, where the capability information is used to indicate the quantity of parallel encoders and/or parallel decoders supported by the terminal device.

Optionally, in some embodiments, the first indication information is determined by the network device 600 based on the quantity of parallel encoders and/or parallel decoders.

Optionally, in some embodiments, the transceiver 620 is further configured to send downlink control signaling to the terminal device, where the downlink control signaling includes the first indication information.

Optionally, in some embodiments, the transceiver 620 is specifically configured to send higher layer signaling to the terminal device, where the higher layer signaling includes the first indication information.

Optionally, in some embodiments, the transceiver 620 is further configured to send second indication information to the terminal device, where the second indication information is used to indicate a coding scheme of the code blocks segmented from the data.

Optionally, in some embodiments, the coding scheme of the code blocks segmented from the data includes at least one of the following coding schemes: an LDPC code; a polar code; a turbo code; a TBCC; and a RM code.

A person of ordinary skill in the art may be aware that, in combination with examples of units and algorithm steps described in the embodiments disclosed in this specification, the present disclosure may be implemented by using electronic hardware or a combination of computer software and electronic hardware. Whether the functions are performed by using hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art may clearly understand that, for the purpose of convenient and brief description, for a detailed working process of the foregoing described system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing described apparatus embodiments are merely examples. For example, the unit division is merely logical function division and may be other division in actual implementations. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The storage medium includes any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for code block segmentation, comprising:
receiving, by a terminal device, first indication information used for performing code block segmentation;
determining, by the terminal device, a code block segmentation manner according to a value of the first indication information; and
performing, by the terminal device, code block segmentation on data based on the code block segmentation manner, to obtain at least one code block,
wherein the code block segmentation manner is one of multiple preset code block segmentation manners, and the data is data carried on a Physical Downlink Shared Channel (PDSCH) or a Physical Uplink Shared Channel (PUSCH),
wherein all values of the first indication information correspond to at least two sets, different sets of the at least two sets correspond to different code block segmentation manners in the multiple preset code block segmentation manners, and
wherein the code block segmentation manner is a code block segmentation algorithm,
wherein the first indication information is used to instruct the terminal device to perform ode block segmentation on data by using a target code block segmentation manner in the multiple preset code block segmentation manners and the first indication information indicates a value of a parameter of the target code block segmentation manner used b the terminal device when the terminal device performs the code bock segmentation on the data,
wherein determining, by the terminal device, code block segmentation manner according to a value of the first indication information; and performing by the terminal device code block segmentation on data based on if code block segmentation manner, to obtain at least one code block comprises:
determining, by the terminal device, a value of a field used to carry the first indication information;
selecting, by the terminal device, a code block segmentation manner corresponding to the value of the field from the multiple preset code block segmentation manners as the target code block segmentation manner;
selecting a value corresponding to the value of the field from a plurality of values of the parameter of the target code block segmentation mariner as the value of the parameter of the target code block segmentation manner, wherein the parameter of the target code block segmentation manner comprises a maximum code length of the code blocks segmented from the data; and performing, by the terminal device, the code block segmentation on the data using the target code block segmentation manner based on the manner based on the value of the parameter of the target code block segmentation manner.

2. The method of claim 1, wherein receiving, by the terminal device, the first indication information used for performing code block segmentation comprises:
receiving, by the terminal device, downlink control information sent by a network device, wherein the downlink control information comprises the first indication information.

3. The method of claim 1 wherein maximum code block sizes corresponding to different code block segmentation manners in the multiple preset code block segmentation manners are different.

4. The method of claim 1, wherein each of the multiple preset code block segmentation manners is applied to a low-density parity-check (LDPC) code.

5. The method of claim 1, wherein each of the multiple preset code block segmentation manners is used to determine a quantity of code blocks contained in the data.

6. A method for code block segmentation, comprising:
generating, by a network device, first indication information used for performing code block segmentation; and
sending, by the network device, the first indication information to a terminal device, so that the terminal device determines a code block segmentation manner according to a value of the first indication information and perform code block segmentation on data based on the code block segmentation manner, to obtain at least one code block,
wherein the code block segmentation manner is one of multiple preset code block segmentation manners, and the data is data carried on a Physical Downlink Shared Channel (PDSCH) or a Physical Uplink Shared Channel (PUSCH),
wherein all values of the first indication information correspond to at least two sets, different sets of the at least two sets correspond to different code block segmentation manners in the multiple preset code block segmentation manners, and
wherein the code block segmentation manner is a code block segmentation algorithm,
wherein the first indication information is used to instruct the terminal device to perform code block segmentation on data by using a target code block segmentation manner in the multiple preset code block segmentation manners and the first indication information indicates a value of a parameter of the target code bock segmentation manner used by the terminal device when the terminal device performs the code block segmentation on the data,
wherein sending by the network device, the first indication information to a terminal device, so that the terminal device determines a code block segmentation manner according to a value of the first indication information and perform code block segmentation on data based on the code bock se(mentation manner, to obtain at least one code block, by:
determining, by the terminal device, a value of a field used to carry the first indication information;
selecting, by the term device, a code block segmentation manner corresponding to the value of the field from the multiple preset code block segmentation manners as the target code block segmentation manner;
selecting a value corresponding to the value of the field from a plurality of values of the parameter of the target code block segmentation manner as the value of the parameter of the target code block segmentation manner, wherein the parameter of the target code block segmentation manner comprises a maximum code length of the code blocks segmented from the data; and
performing, by the terminal device, the code block segmentation on the data using the target code block segmentation manner based on the value of the parameter of the target code block segmentation manner.

7. The method of claim 6, wherein sending, by the network device, the first indication information to the terminal device comprises:
sending, by the network device, downlink control information to the terminal device, wherein the downlink control information comprises the first indication information.

8. The method of claim 6, wherein maximum code block sizes corresponding to different code block segmentation manners in the multiple preset code block segmentation manners are different.

9. The method of claim 6, wherein each of the multiple preset code block segmentation manners is applied to a low-density parity-check (LDPC) code.

10. The method of claim 6, wherein each of the multiple preset code block segmentation manners is used to determine a quantity of code blocks contained in the data.

11. A network device for code block segmentation, comprising:
a transceiver;
a processor; and
a memory storing computer readable instructions executable by the processor,
wherein the processor is configured to:
generate, first indication information used for performing code block segmentation; and
send, through the transceiver, the first indication information to a terminal device, so that the terminal device determines a code block segmentation manner according to a value of the first indication information and perform code block segmentation on data based on the code block segmentation manner, to obtain at least one code block,
wherein the code block segmentation manner is one of multiple preset code block segmentation manners, and the data is data carried on a Physical Downlink Shared Channel (PDSCH) or a Physical Uplink Shared Channel (PUSCH),
wherein all values of the first indication information correspond to at least two sets, different sets of the at least two sets correspond to different code block segmentation manners in the multiple preset code block segmentation manners, and
wherein the code block segmentation manner is a code block segmentation algorithm,
wherein the first indication information is used to instruct the terminal device to perform code block segmentation on data by using a target code block segmentation manner in the multiple preset code block segmentation manners and the first indication information indicates a value of a parameter of the target code block segmentation manner used by the terminal device when the terminal device performs the code bock segmentation or the data, wherein the processor is specifically configured to:
determine a value of a field used to carry the first indication information;
select a code block segmentation manner corresponding to the value of the field from the multiple preset code block segmentation manners as the target code block segmentation manner;
select a value corresponding to the value of the field from a plurality of values of the parameter of the tartlet code block segmentation manner as the value of the parameter of the target code block segmentation manner, wherein the parameter of the target code block segmentation manner comprises a maximum code length of the code blocks segmented from the data; and
perform the code block segmentation on the data using the target code block segmentation manner based on the value of the parameter of the target code block segmentation manner.

12. The network device of claim 11, wherein the processor is further configured to:
send, through the transceiver, downlink control information to the terminal device, wherein the downlink control information comprises the first indication information.

13. The network device of claim 11, wherein maximum code block sizes corresponding to different code block segmentation manners in the multiple preset code block segmentation manners are different.

14. The network device of claim 11, wherein each of the multiple preset code block segmentation manners is applied to a low-density parity-check (LDPC) code.

15. The network device of claim 11, wherein each of the multiple preset code block segmentation manners is used to determine a quantity of code blocks contained in the data.

* * * * *